Aug. 8, 1961
K. W. HANNAH
2,995,714
ELECTROLYTIC OSCILLATOR
Filed July 13, 1955
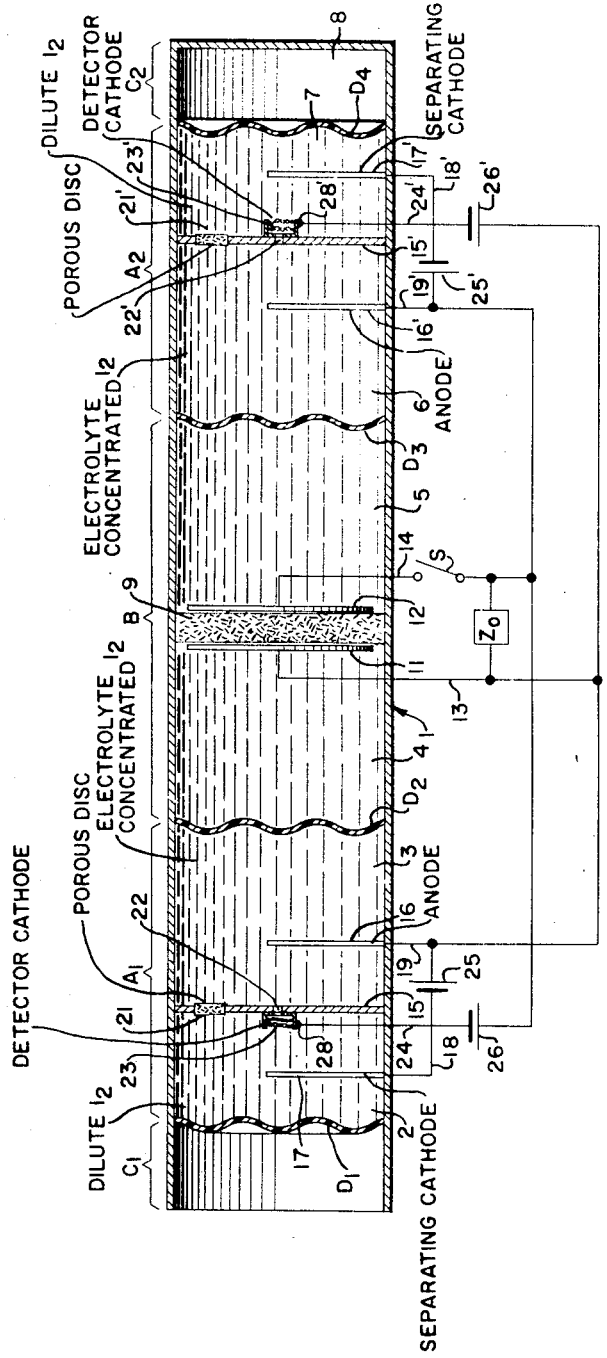
INVENTOR
K. W. HANNAH
BY
ATTORNEY

United States Patent Office 2,995,714
Patented Aug. 8, 1961

2,995,714
ELECTROLYTIC OSCILLATOR
Kenneth W. Hannah, Austin, Tex., assignor, by mesne assignments, to the United States of America as represented by the Secretary of the Navy
Filed July 13, 1955, Ser. No. 521,937
5 Claims. (Cl. 331—107)

This invention relates to an electrolytic oscillator circuit and more particularly to a system adapted to produce electrical and/or fluid wave forms having very low frequencies and in a circuit having very low power consumption requirements. These periodic wave forms may vary from square waves to sine waves depending on the values of the circuit parameters.

More specifically the invention relates to a new combination of an electro-osmotic cell and a pair of electrolytic detector cells in an arrangement which functions to provide low frequency oscillations. Also the instant system utilizes a novel external circuit for initiating oscillation of the device.

In this circuit the electrolytic detectors are electrically connected in polarity opposition to a common load impedance. The voltage signal developed across this load impedance with a current flow therethrough from either detector cell is applied as a potential across the electrodes of the electro-osmotic cell.

The functioning of the electro-osmotic cell relates to principles which have been known in the art for some time. However, these principles have only recently found application in practical physical embodiments of electrokinetic devices due among other reasons to the instability of the fluid used therein. The fluids which are most ideal for filling the electro-osmotic type of cell are very efficient solvents for certain of the plastic materials heretofore available for casing structure for the device and these fluids are readily contaminated by impurities which become dissolved out of the plastic casings. However, by proper selection of materials for the depolarizing electrodes, the plastic case and the diaphragms as well as a fluid which is compatible therewith, a highly successful device has been developed. The functioning of devices of this general class and broadly designated as electrokinetic cells are treated in greater detail in the U.S. Patent 2,661,430 to E. V. Hardway, Jr. dated December 1, 1953. The device of this general character, as shown in the Hardway, Jr. patent relates primarily to a phenomena known as streaming potential rather than being directed specifically to an electro-osmotic cell. The instant electro-osmotic cell differs therefrom, primarily in that the electrodes are of depolarizing material such as silver and silver chloride. The fluid therein may be acetone, distilled water, acetonitrile, or any other fluid suitable for the specific application to which the device is to be used. It has been observed that acetone is somewhat more stable in southern climates while acetonitrile is highly satisfactory in more northern climates. The casing may be of a plastic suitable for the purpose such as polymonochlorotriflouroethylene of a character known in the trade as Kel-F as manufactured by the W. Kellogg Company of Jersey City, New Jersey.

Heretofore there has been no known system for practical usage which even suggests the combining of an electro-osmotic cell in an oscillator nor in the use thereof with an electrolytic detector. The instant invention is unique in the manner of utilizing the combination of a pair of the detector elements and an electro-osmotic cell in an oscillator arrangement.

It is a feature of the instant invention to produce electrical wave forms at very low frequencies and with low power consumption demands on the electrical current supply source connected thereto.

One object of the instant invention is to provide periodic wave forms which may be varied in character from square waves to sine waves by proper selection of values for the desired circuit parameters and in providing signals of this character at very low frequencies.

Another object of the invention is to provide a system for employing an electro-osmotic cell and a pair of electrolytic detector cells in a new combination which is highly reliable for providing low frequency oscillation, is relatively compact, and of high efficiency.

In correlation with the foregoing objects, it is a further object to provide a new and novel coupling circuit working through a common load impedance for providing low frequency oscillations in an electro-osmotic cell circuit.

It is a further object of the instant invention to provide an oscillator circuit which provides all of the advantages of prior oscillator arrangements of a low frequency character while requiring substantially less power demand from the electrical source of potential such as a battery.

It is a further object to provide an oscillator arrangement which may be operated from a battery source and is reliable throughout substantially the entire shelf life of the battery supply.

Other objects and many of the attendant advantages of this invention will be readily appreciated as the same becomes better understood by reference to the following detailed description when considered in connection with the accompanying drawing wherein the drawing is a diagrammatic illustration of an oscillator circuit system combining two electrolytic detectors and an electro-osmotic cell.

Referring now to the drawing there is shown a combination of three cell units designated respectively $A_1$, B, and $A_2$. The end cell units $A_1$ and $A_2$ are electrolytic detector cells, while the cell disposed centrally therebetween at B is an electro-osmotic cell. Disposed at the opposite ends of the cylindrical body of the device are two chambers, which are hydraulic analogues of electrical capacitances and are indicated respectively at $C_1$ and $C_2$. The "capacitance" $C_1$ is an open volume acted against by the compliance of diaphragm $D_1$ while the "capacitance" $C_2$ is a combination of the closed air volume of chamber 8 and the compliance of diaphragm $D_4$.

The several cell elements of the system are separated by diaphragms indicated at $D_1$ to $D_4$ inclusive for the purpose of separation of the dissimilar fluids utilized in the different chambers thereof as will hereinafter become apparent as the description proceeds.

Diaphragms $D_1$ and $D_4$ are of low "capacitance" and separate the "capacitances" of $C_1$ and $C_2$ respectively from the chambers 2 and 7 of the detector cells $A_1$ and $A_2$.

Disposed between the detector cell $A_1$ and the electro-osmotic cell B is a second diaphragm $D_2$ which functions to maintain a separation between the electrolyte in the detector and the fluid chamber 4 indicated in the drawing as being filled with water although it is to be understood that other of the aforementioned fluids may be enclosed therein. A third diaphragm $D_3$ is disposed between the cell B and the detector $A_2$, which separates the chambers 5 and 6 in a manner similar to the functioning of diaphragm $D_2$.

The electro-osmotic cell B disposed in the central portion of the casing 1 comprises a fritted glass disc or porous ceramic filter at 9 which provides a multiplicity of small capillary tubes in fluid communication with the adjacent chambers 4 and 5. A pair of electrode surface elements 11 and 12 are disposed adjacent the filter disc 9 and have leads 13 and 14 connected to the external circuit to be described.

Prior to considering the operation of the overall device of the instant invention for producing oscillation or fluid wave forms the following functional relationships of the electrolytic detectors will facilitate an understanding of the purposes served by the various elements thereof and how the respective elements of the system enter into the combined circuit to provide the desired result.

The linear electrolytic detectors generally designated as $A_1$ and $A_2$ possess the advantageous properties that when the electrolyte fluid contained therein is subjected to a pressure applied at the diaphragms and is flowing in the direction of anode to cathode the cell produces an electric current flow through the fluid and through the electrodes 16, 16' and 23, 23' respectively as the case may be.

A flow of electrolyte fluid in the direction of cathodes 23, 23' to anodes 16, 16' does not produce any electrical current flow through the electrodes and the external circuit. The electrical current flowing with the former situation is proportional to the flow of fluid.

The detector cell units $A_1$ and $A_2$ as enclosed by the diaphragms $D_1$, $D_2$ and $D_3$, $D_4$ respectively, each includes a separating wall 15, or 15'. The separating walls 15, 15' are each provided with a porous ceramic disc 21, or 21' of high hydraulic resistance which provides for electrolytic contact respectively between the chambers 2 and 3 of cell $A_1$ and chambers 6 and 7 of cell $A_2$. These separating walls 15, and 15' are also provided with a very small orifice 22 or 22' as the case may be which provides for a fluid flow through the detector cathode meshes 23 or 23'. The detector cathodes 23, 23' are of platinum gauze and are connected by leads 24, 24' respectively to the negative terminals of one of the batteries 26 or 26' for applying a potential to the electro-osmotic cell when a current is flowing in one of the detector cells $A_1$ or $A_2$. The cathode is enclosed in a Kel-F plastic box 28 or 28' substantially as shown on the drawing.

The electrode system comprising the anode 16 or 16' and the separating cathode 17 or 17' as connected to a biasing battery 25 or 25' functions to provide an initial separation of the $I_2$ iodine molecules of the iodide electrolyte solution after a predetermined period of cell conditioning of about 24 hours, to effectively concentrate the $I_2$ molecules in the chambers 3 or 6. Thereafter it maintains the concentration differences throughout the useful life of the device. The applied potential of the batteries 25, 25' is approximately 0.9 volt. This conditioning of the cells $A_1$ and $A_2$ results in a dilute $I_2$ solution in the chambers 2 and 7.

When one of the detector cells is subjected to an initial unidirectional fluid flow through the cathode orifice 22 or 22' thereof as the case may be, a current is caused to flow in the circuit of the respective anode 16 or 16' and the corresponding cathode 23 or 23' and through the load impedance $Z_0$ to increase the fluid flow through the filter disc 9 of the electro-osmotic cell and in a direction to increase the flow of electrolyte in a current generating direction in the particular one of cells $A_1$ or $A_2$ which provided a closed circuit with initial electrolyte flow for applying the potential of battery 26 or 26' to the electro-osmotic cell B. The other electrically inactive one of the detector cells presents an essentially open circuit through impedance element $Z_0$, since the detectors are essentially unidirectional current generating devices which are connected in polarity opposition, while the electro-osmotic cell is a polarity sensitive device. The manner of providing oscillations will become apparent as the description proceeds.

In the electro-osmotic cell unit generally indicated B, the pressure developed by the active cell is proportional to the potential or voltage across the cell, provided that the load impedance is resistive. If however a "capacitive" load $C_1$ or $C_2$ is used as in the instant case, the "capacitance" load element is effectively charged during the occurrence of fluid flow in the cell and flow which is proportional to the voltage across the cell until the "capacitance" is charged fully whereupon an appreciable back pressure is built up in the effluent portion of the cell by the "capacitance" and results in a reverse flow of fluid through the filter thereof. In the instant case, the unit $C_1$ or $C_2$ is an acoustical "capacitance." The magnitude of the "capacitance" may be variable; e.g., a variable air volume "capacitance."

Assuming that the switch S of the electrical circuit is initially arranged so that when in the open condition no potential is applied to the electro-osmosis cell B, when the switch S is closed one of the background currents of the two electrolytic cells $A_1$ or $A_2$ will be greater. This will product a net current through the impedance $Z_0$. The voltage drop across the impedance is applied as a potential to the electro-osmosis cell B of such a polarity that it tends to cause a flow of fluid in the direction to increase the highest initial current. It may be assumed for purposes of illustration that the current flowing in cell B is increasing the fluid flow in $A_1$ with a resultant increase in electrical current flow. This produces a regenerative action which will continue until the pressure in the "capacitance" $C_1$ reaches the maximum pressure commensurate with particular value of the supply voltage across the electro-osmosis cell B. The fluid flow from B to $A_1$ at this instant is zero. The voltage across the electro-osmosis cell then drops to zero and the pressure developed in the "capacitance" $C_1$ which in this case is the diaphragm $D_1$, tends to produce a fluid flow from B to $A_2$. This reverse flow of fluid produces an electrical current in the detector $A_2$ which causes a voltage drop across the impedance $Z_0$ and applies a potential difference across the electrodes in a direction from 11 to 12 such that the fluid flow is increased in the electro-osmotic cell in a direction toward $A_2$ until maximum pressure of the osmotic cell equals the back pressure of the diaphragm $D_4$ and the enclosed volume 8 which is represented as "capacitance" $C_2$. The fluid flow then becomes zero and reverses to produce a flow toward $A_1$ with a zero potential across electrodes 11 and 12. An oscillating condition is thereby produced in the system. Oscillations of this sort continue until the battery source is depleted or disconnected or switch S is opened. The frequency of oscillation of this system may be controlled by altering the characteristics of $A_1$, $C_1$, $A_2$, $C_2$, B and $Z_0$. While a preferred arrangement of the instant system has been shown on the drawing, it is to be understood that other physical arrangements may be utilized without departing from the scope of the instant invention.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An oscillator circuit device of the character described comprising in combination, an electro-osmotic driving cell, and a pair of electrolytic linear detector cells, each of said detector cells being mutually coupled to said electro-osmotic cell in mutual polarity opposition thereby and being driven thereby to produce an electrical output alternately from each of said detector cells.

2. An oscillator circuit of the character described comprising, an electro-osmotic cell, a pair of electrolytic linear detector cells consisting of a first cell and a second cell each of a character for generating a unidirectional current with flow of the electrolyte solution therein in a predetermined direction, said detector cells being electrically connected in polarity opposition, circuit means connected therewith in a manner to provide a common load impedance across each of said linear detector cells, said circuit means including means for connecting said electro-osmotic cell for regenerative electrical energization contemporaneously with the flow of current in said load impedance, said electro-osmotic cell being mutually coupled hydraulically to each of said electrolytic detector cells in a manner whereby said first detector cell is driven in a direction to produce an electrical output by said electro-osmotic cell when a current potential derived as an output from said first detector cell is flowing through said load impedance, and compliant means in each of said detector cells for terminating the flow of electrolyte fluid in said detector cells after a predetermined period of fluid flow whereby the regenerative driving action of said electro-osmotic cell is terminated and a reverse fluid flow initiated to drive the second detector cell of said pair to produce an electrical output after termination of the electrical output of said first detector cell, whereby oscillations are provided thereby.

3. An electrolytic oscillating circuit of the character described having low power consumption characteristics which comprises an electro-osmotic cell, a first and a second electrolytic detector cell, bias potential means for each of said electrolytic detector cells, and circuit means so connected between said detector cells as to provide a common load impedance thereto, the electro-osmotic driving cell being connected across said load impedance in a manner to provide a flow of fluid in a direction correlative to the direction of the net current flow in said load impedance, each of said detecting cells being connected to said load impedance in a manner to provide regenerative energization of said electro-osmotic cell with driving action by said electro-osmotic driving cell, said detector cell being disposed in mutually coupled relation to said electro-osmotic driving cell, and means in each of said electrolytic detector cells for terminating and reversing the fluid flow in the electric current generating direction in said driving cell after a predetermined period of said current producing fluid flow therein whereby said detector cells are effectively alternately energized by said electro-osmotic cell and oscillations are produced by said circuit.

4. An electrolytic oscillating circuit of the character described and having low power consumption characteristics which comprises an electro-osmotic driver cell, first and second electrolytic detector cells, said detector cells being disposed in mutually coupled relationship to said driver cell in electrical polarity opposition, circuit means providing a source of bias for each of said detector cells, a load impedance means connected in common to both of said detector cells, said load impedance being further connected to said electro-osmotic cell in a manner to provide a fluid flow thereto in correlation with the direction of net current flow in said load impedance whereby oscillations are provided by said circuit with changes of direction of drive of said electro-osmotic cell with polarity changes of the current flow in said load impedance.

5. An electrolytic oscillating circuit comprising an electro-osmotic cell and a plurality of linear detector cells mutually coupled to said electro-osmotic cell, a source of bias for each of said detector cells, a common load impedance connected between said electrolytic detector cells in a manner to apply a potential correlative with the net current flow therethrough to said electro-osmotic cell in a manner to produce fluid flow therethrough in a direction corresponding to the direction of said applied potential, means for regeneratively applying a potential from one of said electrolytic detector cells with driving action of said electro-osmotic cell, means for sequentially reversing the application of current flow through said impedance whereby the detecting cells are alternately driven by said electro-osmotic signal.

No references cited.